United States Patent [19]
Luecke

[11] Patent Number: 5,168,168
[45] Date of Patent: Dec. 1, 1992

[54] DEVICE FOR CENTERING ROUND ARTICLES

[75] Inventor: Francis S. Luecke, San Jose, Calif.

[73] Assignee: New Focus, Inc., Mountain View, Calif.

[21] Appl. No.: 698,434

[22] Filed: May 10, 1991

[51] Int. Cl.[5] ............................................. B25J 15/00
[52] U.S. Cl. .................... 294/106; 294/902; 269/237
[58] Field of Search ................ 294/106, 104, 902, 28; 901/39, 31; 269/237, 238, 239, 34

[56] References Cited

U.S. PATENT DOCUMENTS

| | | | |
|---|---|---|---|
| 2,024,112 | 12/1935 | Phillis | 269/237 X |
| 4,478,451 | 10/1984 | Brücher et al. | 294/86.4 X |
| 4,796,877 | 1/1989 | Musil et al. | 269/239 X |
| 4,810,019 | 3/1989 | Brücher et al. | 294/902 X |

FOREIGN PATENT DOCUMENTS

| | | | |
|---|---|---|---|
| 905063 | 2/1982 | U.S.S.R. | 294/902 |
| 1399059 | 5/1988 | U.S.S.R. | 269/239 |

OTHER PUBLICATIONS

Ealing Catalogue No. E100K/190.
Klinger Catalogue, 1990.

Primary Examiner—Charles A. Marmor
Assistant Examiner—Joseph D. Pape
Attorney, Agent, or Firm—Townsend and Townsend

[57] ABSTRACT

A holder for centered round articles comprises a frame having a first arm and a second arm pivotally attached thereto. The first arm defines a single contact point at its distal end while the second arm defines a pair of diverging surfaces at its distal end. The two arms are mechanically coupled to rotate relative to each other in a fixed relationship, and the curved surfaces on the second arm are shaped in a particular manner so that circular articles held by the two arms will be centered at a fixed location relative to the frame.

12 Claims, 4 Drawing Sheets

DEVICE FOR CENTERING ROUND ARTICLES

BACKGROUND OF THE INVENTION

The present invention relates generally to apparatus for interchangeably mounting articles. More particularly, the present invention relates to a device which can center and hold circular articles of varying diameter.

Apparatus for interchangeably mounting articles are available in almost infinite variety. Of particular interest to the present invention are apparatus for interchangeably mounting articles having circular peripheries, where the diameter of the individual articles may vary over a fairly large ratio. Exemplary mounting apparatus of this type include optical component holders for mounting lenses, mirrors, beam splitters, gratings, and the like.

Optical component holders themselves may take a variety of forms. One common form comprises a pair of opposed jaws which are spring-mounted on a frame or post. Each jaw is V-shaped and is grooved along its inner surface so that the optical component can be mounted by spreading the jaws apart, placing the article between the jaws, and allowing the jaws to close under the spring tension to hold the component in place. One such optical component holder is commercially available as Catalogue Number 22—8155 (Spring Grip Lens Holder) in Ealing Catalogue Number E100K/190, pages C24 and C25.

While such opposed arm optical element holders are functional, they suffer from being able to accommodate only a relatively limited range of diameters, typically within a ratio of only about 1:2. Moreover, the center point of a circular optical component held in such a device will move relative to a fixed portion of the holder depending on the diameter of the particular component which is being held. Such a characteristic is undesirable when optical components of different diameters are interchanged and it is desirable to maintain centering of the component relative to an externally originating light beam.

A second type of optical component mount which provides for such centering is referred to generally as an "iris" mount. Such iris mounts include three or more pivotably attached arms which are located around the periphery of a circular frame. By adjusting the inward travel of each of the arms equally, the device can hold components of varying diameter so that they are centered concentrically relative to the center of the circular frame. An exemplary iris mounting device is commercially available as "PSC"100 holder with concentric grip" (Cat. No. 178 133), Klinger Catalogue, 1990, page 225.

Although such iris mounts are very useful in theory, it can be difficult to maintain precise alignment of all three arms to assure that the optical component is precisely centered. The design of iris mounts which assure such simultaneous alignment of all three arms can be complicated and the resulting devices are not always sturdy. Additionally, the distance between the center of the object being held and the periphery of the holder is always large, making it difficult to position optical elements to receive closely spaced light beams.

For these reasons, it would be desirable to provide alternative designs for mounting apparatus having the capability of holding and centering circular articles having varying diameters. It would be particularly desirable if the device could hold circular articles having diameters which vary over a range greater than 2:1, preferably greater than 3:1, and more preferably greater than 10:1. Such devices should have a minimum number of working parts and should be of sturdy construction so that it is easy to maintain alignment of the parts. It would be particularly desirable if the device could be adapted to act as a grasping element or a gripping element on a robotic arm or other assembly for capturing circular articles at a first location and moving them to a second location.

SUMMARY OF THE INVENTION

According to the present invention, a holder for round articles will center the articles with respect to a frame. The apparatus comprises a pair of arms pivotally attached at their proximal ends to the frame, where the first arm defines a single contact point at its distal end and the second arm defines a pair of diverging surfaces at its distal end. The diverging surfaces each define a continuous locus of contact points which are available to contact a round article depending on its diameter. The arms are mechanically coupled so that they rotate about their respective pivot points (which may be spaced-apart or concentric) at a known ratio, usually a constant ratio. The position of the single contact point on the first arm and the shapes of the diverging surfaces on the second arm are then selected so that they will contact three points on the circular article being held, regardless of its diameter, and hold such articles with their center points at a single fixed location relative to the frame.

The present invention further includes a holder having a second arm with particular curved surfaces which have been precisely defined to meet conditions where (1) the first and second arms are spaced-apart but pivotally mounted at positions which are equidistant from the desired article center point and (2) the arms move at a constant rotational ratio. Precise formulas are given for calculating the curved surfaces for any particular radius (arm length) and rotational movement ratio. It will be appreciated, however, that curves can also be calculated for other conditions, including conditions where the pivot points of each arm are located at different distances from the article's center point and/or the arms rotate relative to each other at a non-constant ratio.

The holder of the present invention is particularly useful as a device in an optical mounting system where it is frequently desired to interchange particular optical components having different diameters positioned at critical locations on an optical path. Usually, the holder of the present invention will be mounted on a post or other platform which has been precisely positioned to hold the optical component at the critical location. The holder of the present invention allows the component to be interchanged with another component having a different diameter, with the center point of the second round component remaining coincident with that of the first round component.

The holder of the present invention will also find use in systems where it is desired to grasp or capture a circular article at a first location and move the article to another location. For example, the holder may be used as an actuator or a grasper on a robotic arm programmed to move circular articles in a predetermined manner. The holder of the present invention is particularly useful when articles of varying diameter may be randomly present at a pick-up location so that it is necessary only to align the known center point of the holder with the anticipated center point of the article. Use of the holder of the present invention further simplifies automatic control of robotic arms and other automatic systems since the center point to the holding arms will not vary depending on the amount they are opened.

DESCRIPTION OF THE SPECIFIC EMBODIMENTS

Figure 1:
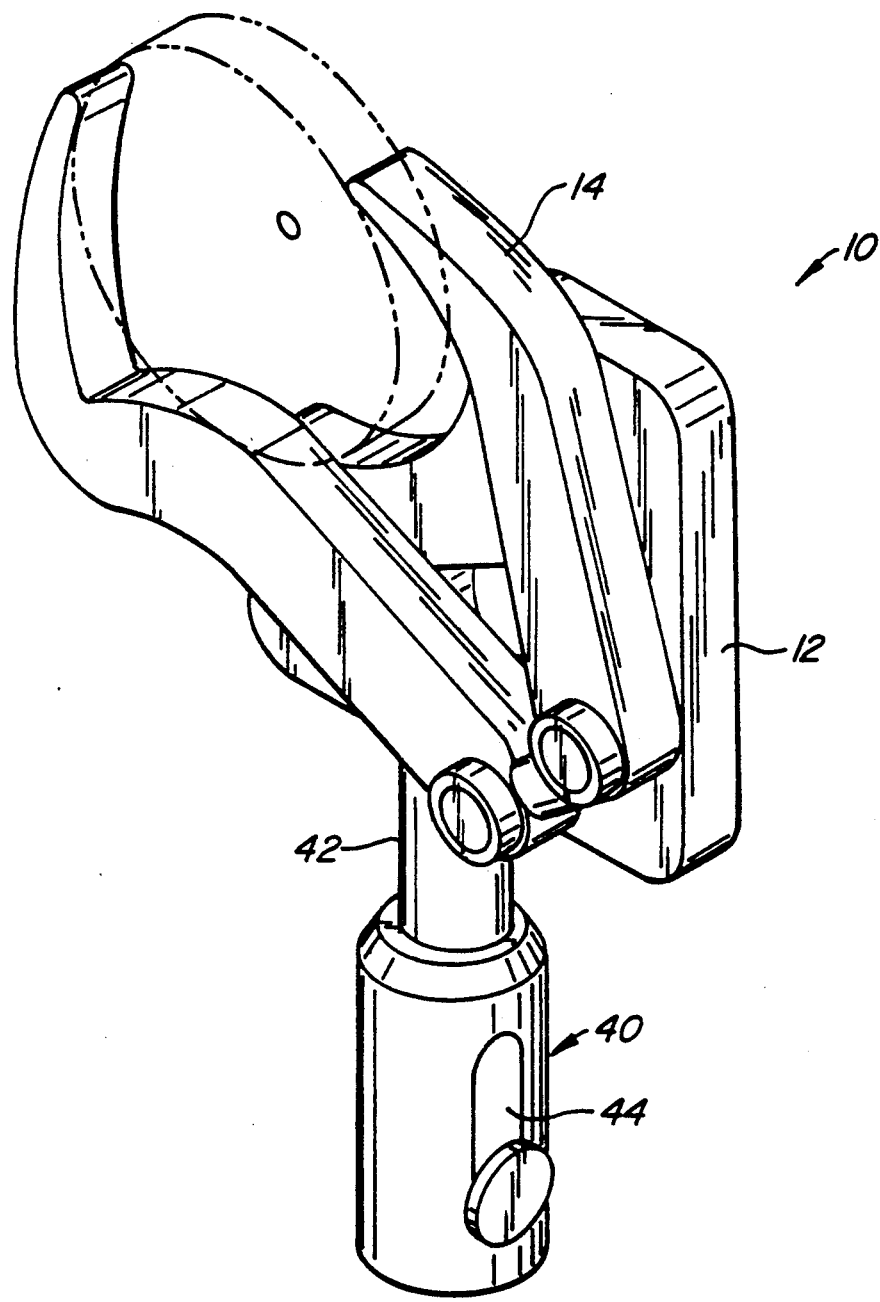
FIG. 1 is a perspective view of a round article holder constructed in accordance with the principles of the present invention, where the holder is mounted on a variable height mounting post.
Figure 2:
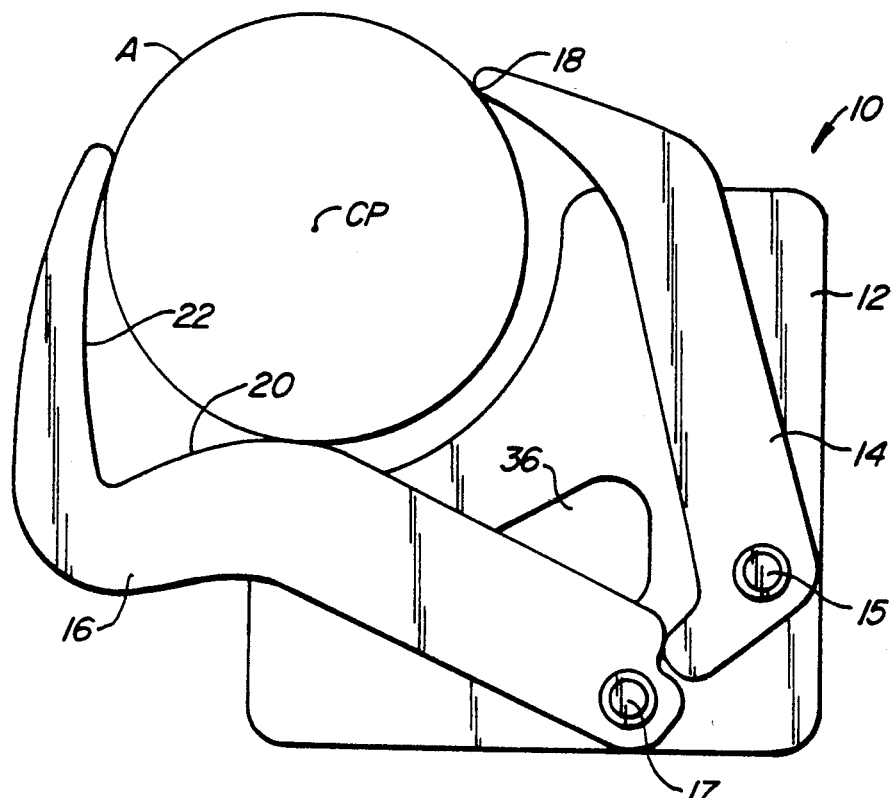
FIG. 2 is a front elevational view of the holder of FIG. 1, shown holding a relatively large circular article.
Figure 3:
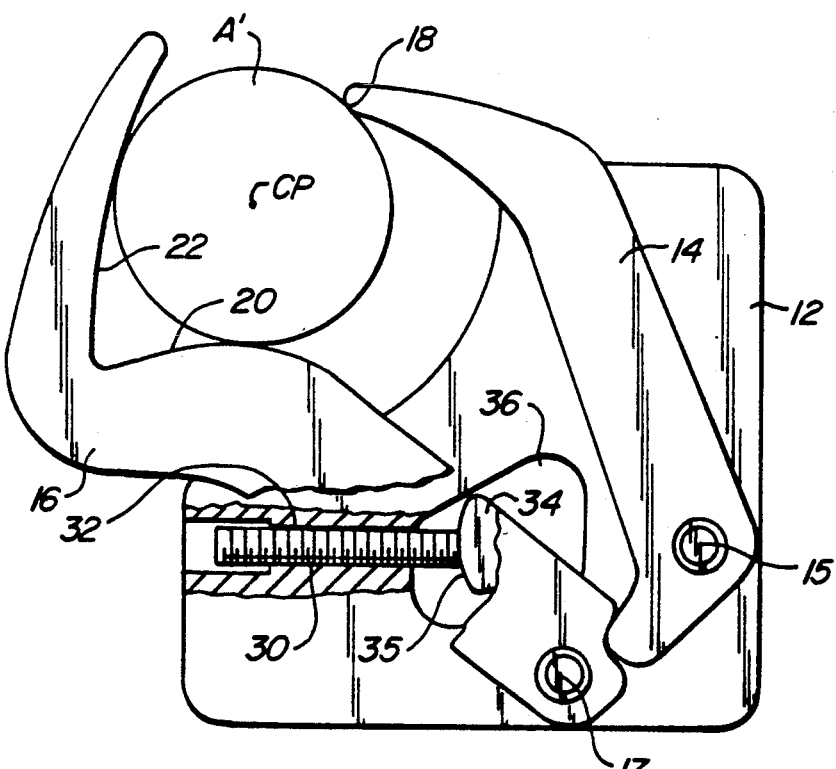
FIG. 3 is a front elevational view of the holder of FIG. 1, shown with portions broken away and holding a medium sized circular article.

Referring to FIGS. 1-4, a round article holder 10 constructed in accordance with the principles of the present invention includes a frame 12, a first arm 14 pivotally mounted on the frame, and a second arm 16 pivotally mounted on the frame. The first arm 14 includes a contact point 18 at its distal end, while the second arm 16 includes a pair of diverging surfaces 20 and 22 at its distal end. As illustrated in FIGS. 1 and 2, the arms 14 and 16 can hold a circular article A therebetween so that contact point 18 on arm 14 contacts the article at a first point and surfaces 20 and 22 contact the article at the second and third points, respectively. The article A is held so that its center point CP is at a particular position relative to the frame 12. As will be discussed in greater detail hereinafter, the position of contact point 18, the shapes of curves 20 and 22, the positions of pivot points 15 and 17, and the rate at which the arms 14 and 16 rotate relative to each other are each specifically chosen so that the holder 10 can hold articles A of different diameters while maintaining the center point of each article at precisely the same position relative to the frame 12.

The arms 14 and 16 are mechanically coupled together so that the arms rotate in opposite directions at known rates relative to each other. Usually, the arms will be coupled so that they rotate at a fixed constant ratio as this simplifies the construction of the device and the calculation of the shapes of curved surfaces 20 and 22. It is possible, however, that the arms would be coupled to rotate in a non-constant or even non-linear fashion relative to each other, and the remaining parameters of the system, particularly the shape of curves 20 and 22, could be adjusted to accommodate such a non-linear relationship.

The coupling mechanism between the arms can take a variety of forms, including chains, timing belts, bar linkages, band drives, and the like. It is generally preferred, however, to use gear assemblies for coupling the motion of the arms together. Particularly preferred is a single tooth mating gear, as illustrated in the drawings, having involute teeth forms to provide a constant rotational ratio between the arms. The illustrated gear is designed to provide a constant ratio of 1.6:1 between the arms 14 and 16, where arm 16 rotates 1.6 units in the counterclockwise direction (as illustrated in the drawings) for each unit that arm 14 rotates in the clockwise direction.

As illustrated, the pivot points 15 and 17 are spaced-apart and are equidistant from the center point CP of the articles A, A' which are being held. It is not necessary, however, that the pivot points be located at a fixed distance, although when they are located at different distances the calculation of the curved surfaces (as described in detail hereinbelow) is somewhat more complicated.

It is also possible to mount the pivot points of the first and second arms concentrically on a single pivot point. Such concentric mounting, however, requires a more elaborate gearing mechanism, such as a jackshaft gear, which is generally more difficult to incorporate in the design. There are no other advantages associated with concentric mounting of the arms, so it will generally be preferred to employ a spaced-apart mounting as illustrated.

A locking screw 30 (FIG. 3) will usually be provided so that the arms 14 and 16 may be firmly held against the article A, A' being supported. The locking screw 30 is received in a threaded aperture 32 formed in the side of frame 12 and engages a tab 34 which is attached to the rear surface of arm 16 and present in an aperture 36 formed through the frame 12. Thus, the locking screw 30 engages a surface 35 defined by the tab 34, causing the arm 16 to rotate inward (clockwise) against the article A, A'. Arm 14, in turn, is rotated inward (counterclockwise) by the coupling mechanism. Optionally, the arms may be further coupled by a spring element (not illustrated) to further assure that the article A, A' will be held firmly therebetween.

Figure 4:
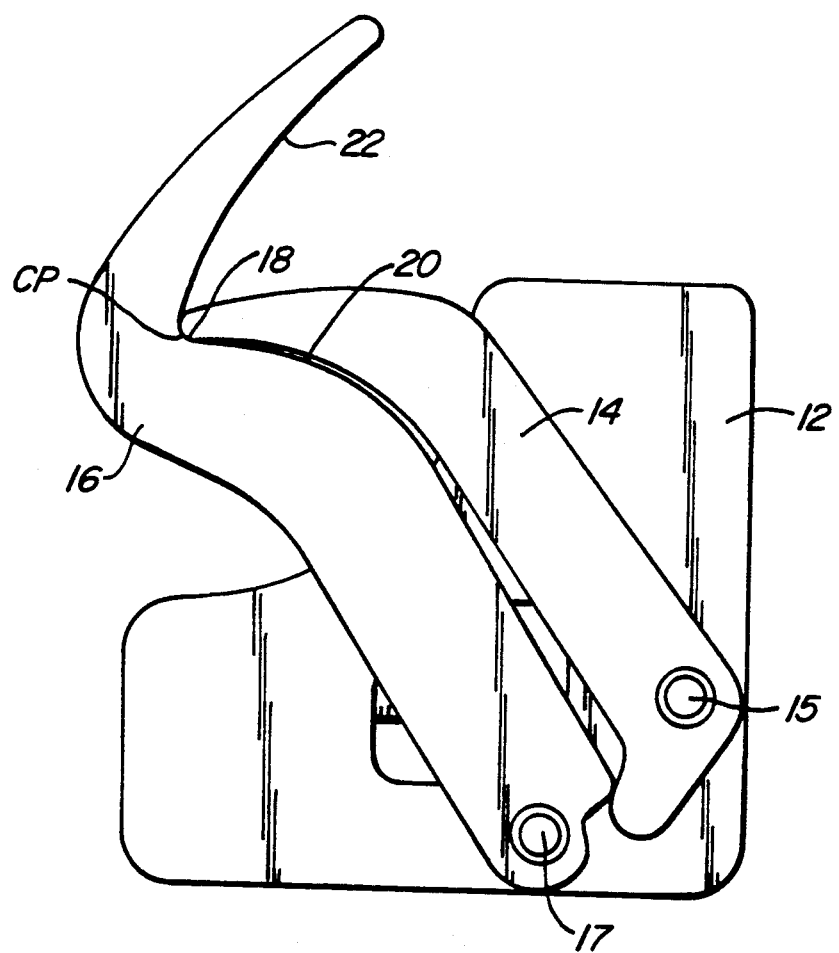
FIG. 4 is a front elevational view of the round article holder of FIG. 1, shown with its holding arms substantially closed.

Referring now in particular to FIG. 4, the arms 14 and 16 are illustrated in their fully closed configuration. There, the contact point 18 on arm 14 engages the cleft where surfaces 20 and 22 converge on arm 16 at the point which is the center point for the held articles. In this way, circular articles having very small diameters can be held when the arms are close together, as illustrated in FIG. 4, as well as articles having relatively large diameters, such as article A in FIG. 2. Of course, to fully close against and concentrically hold an article of infinitesimally small diameter, both the cleft and the contact point 18 on arm 4 would have to meet with complementary V-shaped geometries. The radiused geometries illustrated are a compromise which facilitates machining.

The holders 10 of the present invention may be mounted on a variety of surfaces and other devices. As illustrated in FIG. 1, the frame 12 is conveniently attached to a mounting post 40 having a vertically adjustable shaft 42 which is secured directly to the frame. The mounting post 40 includes a lever 44 which may be depressed to allow raising and lowering of the shaft 42. The construction of such mounting post is described in detail in copending Application Ser. No. 07/638,886, filed on Jan. 7, 1991, the disclosure of which is incorporated herein by reference.

Figure 5:
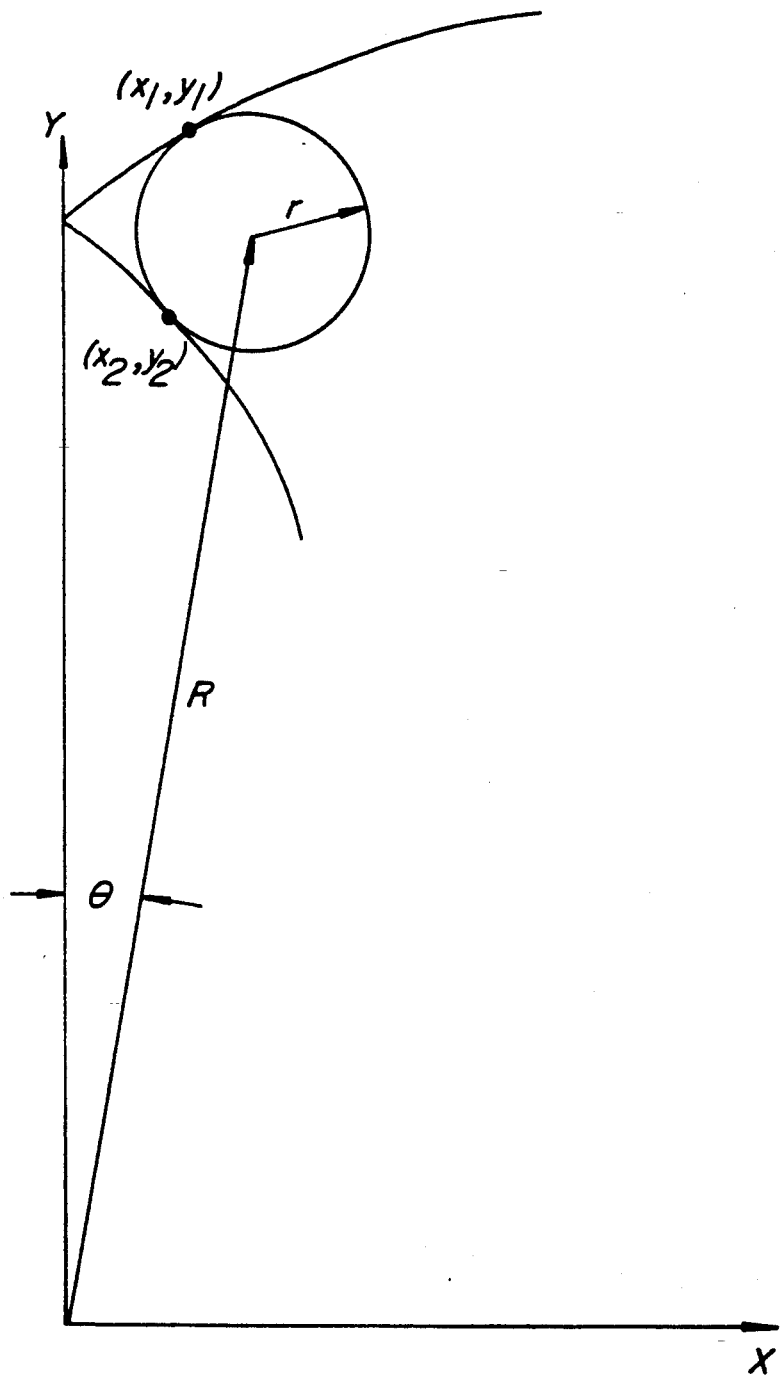
FIG. 5 illustrates the curved surfaces of the second arm of the circular article holder of the present invention, including the parameters which are used in calculating the curves in a Cartesian plane.

Referring now to FIG. 5, the equations for the two curved surfaces 20 and 22 in a Cartesian plane will be described. The formulas assume that the distance between the center point CP and the pivot points 15 and 17 will be equal and have a value R (which is arbitrarily selected). It is further assumed that the ratio between the clockwise rotation of first arm 14 and the counterclockwise rotation of the second arm 16 will have a constant value C (which is arbitrarily selected and determined by the structure of coupling mechanism). Based on these assumptions, the Cartesian coordinates of the curve 20 ($X_2$, $Y_2$) and second curve 22 ($X_1$, $Y_1$) may be calculated as follows.

$X_1 = R\ (P+Q)$
$Y_1 = R\ (S+T)$
$X_2 = R\ (P-Q)$
$Y_2 = R\ (S-T)$,
wherein $$P = \sin\theta - \left(\sin\frac{\theta}{C}\right)\left(\frac{\cos\theta}{C}\right);$$

$$Q = (2\sin\theta)\left(\sin\frac{\theta}{2C}\right)\left(1 - \frac{\cos^2\frac{\theta}{2C}}{C^2}\right)^{0.5};$$

$$S = \cos\theta + \frac{\left(\sin\frac{\theta}{C}\right)(\sin\theta)}{C};$$

$$T = (2\cos\theta)\left(\sin\frac{\theta}{2C}\right)\left(1 - \frac{\cos^2\frac{\theta}{2C}}{C^2}\right)^{0.5};$$

$\theta$ is the angle of divergence between the point where curves 20 and 22 converge and the center point CP, measured at pivot point 17.

The actual curve illustrated in FIG. 5 is based on a C equal to 1.6. The radius of the article being held is r equal to $2R\sin\theta/2C$.

Although the foregoing invention has been described in detail for purposes of clarity of understanding, it will be obvious that certain modifications may be practiced within the scope of the appended claims.

What is claimed is:

1. A holder for centered round articles, said holder comprising:
    a frame;
    a first arm pivotally attached at a proximal end to a pivot point on the frame, said first arm defining a single contact point at a distal end;
    a second arm pivotally attached at a proximal end to a pivot point on the frame's and second arm defining a pair of diverging surfaces each of which define a continuous locus of contact points; and
    means for mechanically coupling the first and second arms to control their ratio of relative rotational motion, wherein the position of the single contact, the shapes of the diverging surfaces, and the ratio of relative rotational motion are selected to maintain a center point of the held article at a fixed position relative to the frame regardless of article diameter.

2. A holder as in claim 1, wherein the pivot point of the first arm on the frame is spaced-apart from the pivot point of the second arm.

3. A holder as in claim 1, wherein the mechanical coupling means is a gear.

4. A holder as in claim 3, wherein the gear is a single tooth mating gear.

5. A holder as in claim 1, wherein the mechanical coupling means provides a constant ratio of relative rotational translation.

6. A holder as in claim 1, wherein the distances from the pivot point of each arm to the fixed center point are equal.

7. A holder as in claim 6, wherein the diverging surfaces follow curves having the following equations in a Cartesian plane:

$X_1 = R\ (P+Q)$
$Y_1 = R\ (S+T)$
$X_2 = R\ (P-Q)$
$Y_2 = R\ (S-T)$, ps wherein
R is the radial length from the pivot point of each arm to the fixed center point;

$$P = \sin\theta - \left(\sin\frac{\theta}{C}\right)\left(\frac{\cos\theta}{C}\right);$$

$$Q = (2\sin\theta)\left(\sin\frac{\theta}{2C}\right)\left(1 - \frac{\cos^2\frac{\theta}{2C}}{C^2}\right)^{0.5};$$

$$S = \cos\theta + \frac{\left(\sin\frac{\theta}{C}\right)(\sin\theta)}{C};$$

$$T = (2\cos\theta)\left(\sin\frac{\theta}{2C}\right)\left(1 - \frac{\cos^2\frac{\theta}{2C}}{C^2}\right)^{0.5};$$

$\theta$ is the angle of divergence of the second arm at its pivot point between the point where the two curves converge on the second arm and the fixed center point of the article being gripped; and
C is the ratio of rotational translation of the first arm to the second arm.

8. A holder for centered round articles, said holder comprising:
    a frame;
    a first arm pivotally attached at proximal end to a pivot point on the frame, said first arm defining a single contact point at a distal end and having a cam surface at a proximal end; and
    a second arm pivotally attached at a proximal end to a pivot point on the frame, said second arm defining a pair of diverging surfaces at a distal end each of which define a continuous locus of contact points and having a cam surface at a proximal end;
    wherein the cam surface on the first arm engages the cam surface on the second arm to control the ratio of relative rotational motion of the arms, and wherein the position of the single contact, the shapes of the diverging surfaces, and the ratio of relative rotational motion defined by the cam surfaces are selected to maintain a center point of the held article at a fixed position relative to the frame regardless of article diameter.

9. A holder as in claim 8, wherein the pivot point of the first arm on the frame is spaced-apart from the pivot point of the second arm.

10. A holder as in claim 8, wherein the cam surfaces provide a constant ratio of relative rotational translation.

11. A holder as in claim 8, wherein the distances from the pivot point of each arm to the fixed center point are equal.

12. A holder as in claim 11, wherein the diverging surfaces follow curves having he following equations in a Cartesian plane:

$X_1 = R (P+Q)$
$Y_1 = R (S+T)$
$X_2 = R (P-Q)$
$Y_2 = R (S-T)$, wherein

R is the radial length from the pivot point of each arm to the fixed center point;

$$P = \sin \theta - \left(\sin \frac{\theta}{C}\right)\left(\frac{\cos \theta}{C}\right);$$

$$Q = (2 \sin \theta) \left(\sin \frac{\theta}{2C}\right)\left(1 - \frac{\cos^2 \frac{\theta}{2C}}{C^2}\right)^{0.5};$$

$$S = \cos \theta + \frac{\left(\sin \frac{\theta}{C}\right)(\sin \theta)}{C};$$

$$T = (2 \cos \theta) \left(\sin \frac{\theta}{2C}\right)\left(1 - \frac{\cos^2 \frac{\theta}{2C}}{C^2}\right)^{0.5};$$

$\theta$ is the angle of divergence of the second arm at its pivot point between the point where the two curves converge on the second arm and the fixed center point of the article being gripped; and C is the ratio of rotational translation of the first arm to the second arm.

* * * * *